United States Patent [19]
Lohmann, II et al.

[11] Patent Number: 5,745,692
[45] Date of Patent: Apr. 28, 1998

[54] AUTOMATED SYSTEMS ADMINISTRATION OF REMOTE COMPUTER SERVERS

[75] Inventors: David Peter Lohmann, II, San Diego; Steven Michael Hurlbut, Ramona; John Carl Shumate; Jeffrey Scott Shelton, both of San Diego, all of Calif.

[73] Assignee: NCR Corporation, Dayton, Ohio

[21] Appl. No.: 547,092

[22] Filed: Oct. 23, 1995

[51] Int. Cl.$^6$ ................................................. G06F 13/00
[52] U.S. Cl. .......................... 395/200.53; 395/200.54; 395/200.49
[58] Field of Search .................. 395/200.11, 200.53, 395/200.54, 200.49, 610, 838, 839, 185.08

[56] References Cited

U.S. PATENT DOCUMENTS

| | | | |
|---|---|---|---|
| 5,367,670 | 11/1994 | Ward et al. | 395/575 |
| 5,438,607 | 8/1995 | Przygoda, Jr. et al. | 379/38 |
| 5,444,849 | 8/1995 | Farrand et al. | 395/200.09 |
| 5,559,958 | 9/1996 | Farrand et al. | 395/183.03 |
| 5,621,727 | 4/1997 | Vaudreuil | 370/60 |
| 5,629,687 | 5/1997 | Sutton et al. | 379/37 |

OTHER PUBLICATIONS

*Informist ® Software Package, Version 1.3 Quick Start Guide*, Gold Systems, Inc., Boulder, CO 1993.

Primary Examiner—Mehmet B. Geckil
Attorney, Agent, or Firm—Merchant, Gould, Smith, Edell, Welter & Schmidt

[57] ABSTRACT

A method, apparatus and program product for remotely administrating a computer server. An alert message is received from a remote server at a central support site. The alert message is matched to a contact person, i.e., systems administrator, for the server stored in a database at the central support site. A message is transmitted from the central support site to the systems administrator. When a call is received from the systems administrator at the central support site, the call is then matched to the alert message, and any further attempts to contact the systems administrator in response to the alert message is terminated at the central support site. The central support site waits for a call from the systems administrator for a predetermined period of time. If the time expires without a return call, a backup contact for the server is retrieved from the database at the central support site, and the message is re-transmitted from the central support site to the backup systems administrator. Once the systems administrator contacts the processor, they may enter either voice commands or Touch-Tone keypad commands that are then translated into server commands and transmitted to the remote server. The central support site may also transmit status queries to the remote server, and receive responses therefrom that are then communicated to the systems administrator.

15 Claims, 8 Drawing Sheets

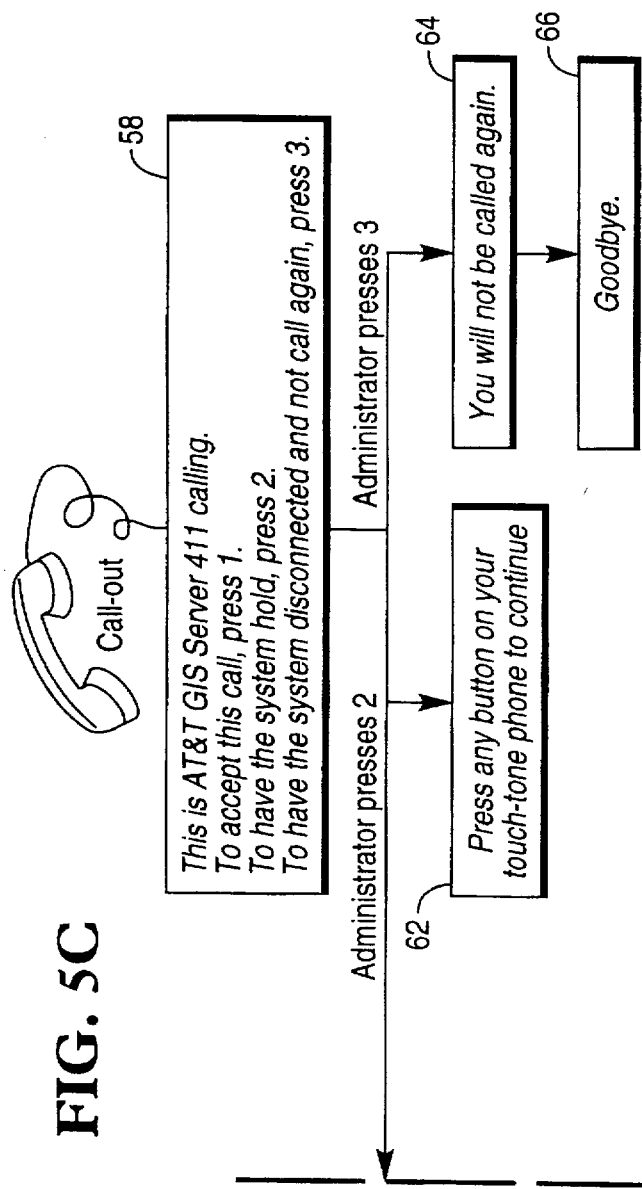
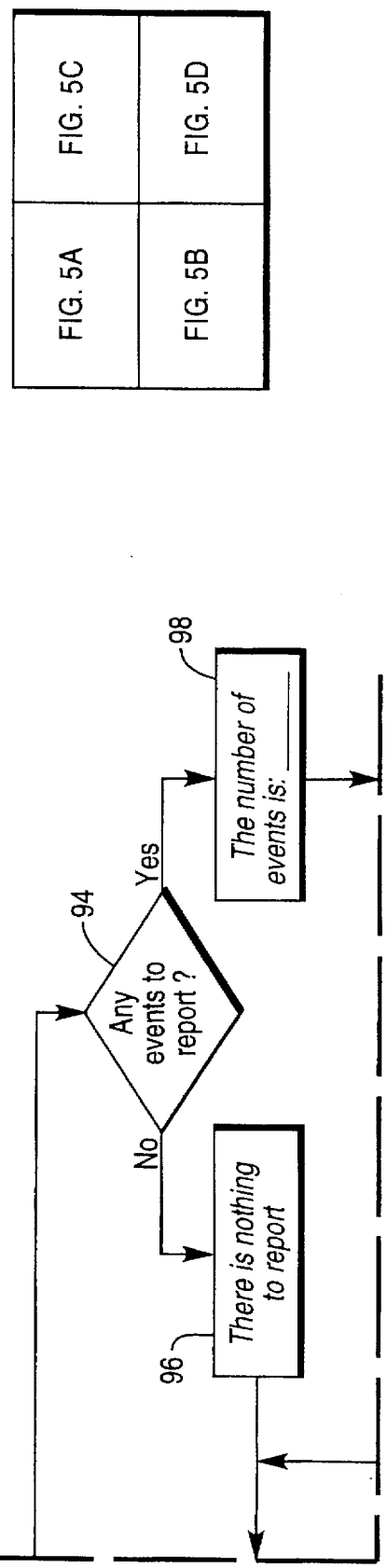

AUTOMATED SYSTEMS ADMINISTRATION OF REMOTE COMPUTER SERVERS

BACKGROUND OF THE INVENTION

1. Field of Invention

The present invention generally relates to systems administration of computer networks, and in particular, to an automated system for notifying systems administrators of problems with computer servers and providing a voice-activated or Touch-Tone keypad communications method for responding to those problems by transmitting commands to the servers.

2. Description of Related Art

Remote systems administration of a computer network is typically accomplished by using a computer with a modem to connect to the network. Systems administrators may also use inter-network routing and access to execute maintenance commands. These options allow the systems administrator to retrieve critical information about the status of a computer network and to invoke commands to correct any problems.

However, when systems administrators are off-duty or physically located away from the network they manage, and when they are not connected with these systems, they do not have an easy way to retrieve critical information or invoke commands using only an ordinary telephone. Ordinarily, to get the desired information, the systems administrator must call someone to execute commands from the system console, or find a networked system, or find a computer with a modem to connect remotely. This can become inconvenient if these resources are not immediately available, or impossible if the network is in a locked, hung, or crashed state.

Such lack of access prevents systems administrators from responding immediately to system failures. Consequently, maintenance of the computer network is delayed and the total downtime at the server site is increased.

Thus, there is a need in the computer industry for a method and apparatus that rectifies the above concerns.

SUMMARY OF THE INVENTION

To overcome the limitations in the prior art described above, and to overcome other limitations that will become apparent upon reading and understanding the present specification, the present invention discloses a method, apparatus and program product for automated systems administration of remote computer servers. An alert message is received from a remote server at a processor located at a central support site. The alert message is matched to a contact person for the server, i.e., systems administrator, stored in a database at the central support site. A message is transmitted from the central support site to the systems administrator via e-mail, pager, phone, facsimile or console message.

The central support site waits for a return call from the systems administrator for a predetermined period of time. If the time expires without a return call, a backup contact for the server is retrieved from the database at the central support site, and the message is re-transmitted from the central support site to the backup systems administrator.

In practice, the backup systems administrator can be any user-configurable number of people. The present invention allows the systems administrator to specify any number of other administrators to be notified of an event, the escalation order, the delay between escalations, and the method of notification (phone, pager, fax, e-mail, etc.).

When a return call is received from the systems administrator at the central support site, the call is then matched to the alert message, and any further attempts to contact the systems administrator in response to the alert message is terminated at the central support site.

Once the systems administrator contacts the central support site, they may also enter either voice commands or Touch-Tone keypad commands that are then translated into server commands and transmitted to the remote server. The central support site may also transmit status queries to the remote server, and receive responses therefrom that are then communicated to the systems administrator.

BRIEF DESCRIPTION OF THE DRAWINGS

Referring now to the drawings in which like reference numbers represent corresponding parts throughout:

FIGS. 5A–5D are flowcharts illustrating the logic performed by the AT&T Conversant system in responding to a systems administrator.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

The present invention provides an automated systems administration capability for computer networks. In the present invention, an error or fault or alert condition in the operation of the server 10 results in the transmission of an alert message from the server to a central support site. The present invention is capable of receiving, communicating, and responding to multiple types of alerts, from informational alerts to serious problems to fatal errors, including server crashes or power failures.

Figure 1:
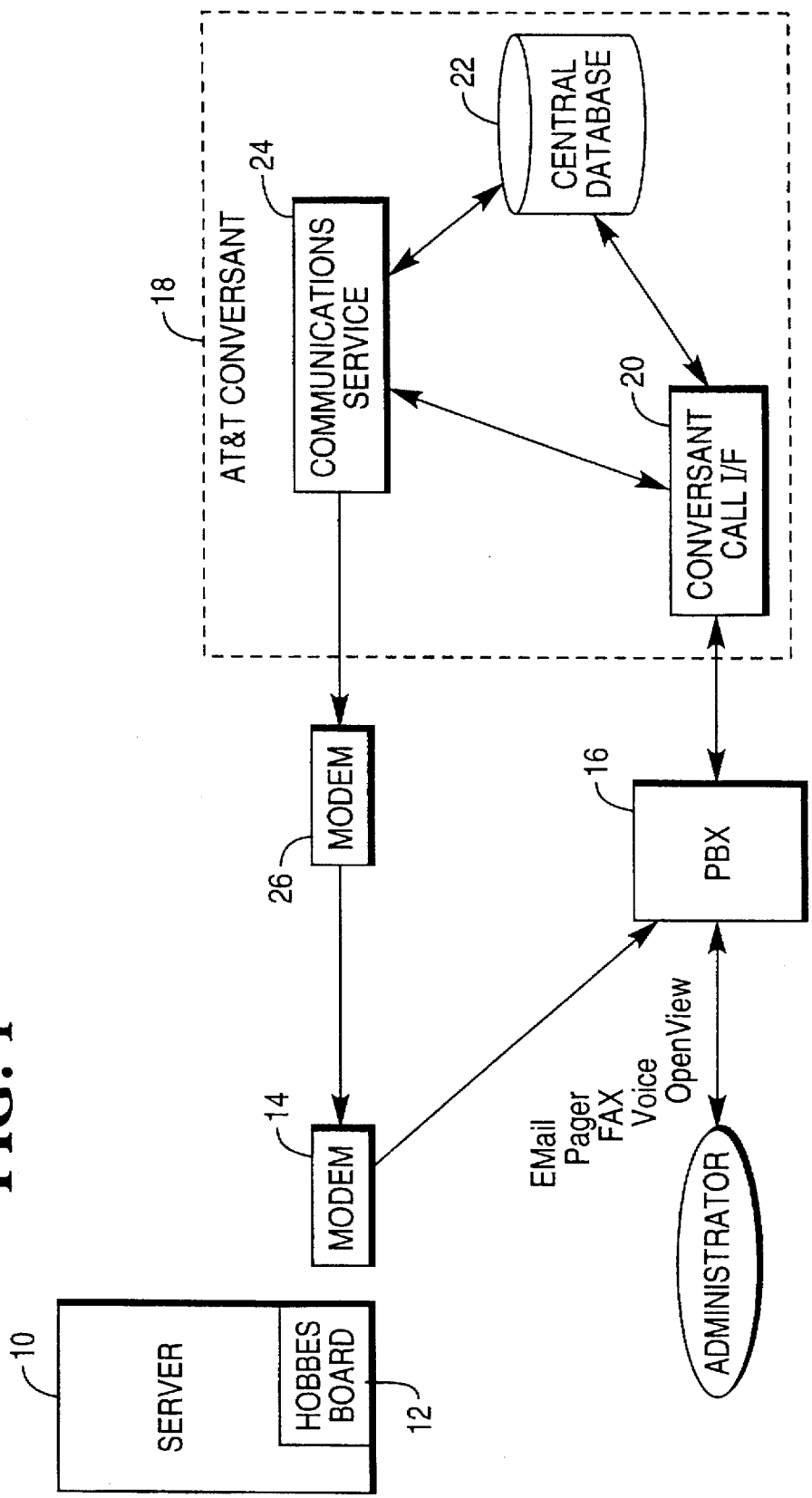
FIG. 1 illustrates one possible hardware embodiment for performing the present invention.

FIG. 1 illustrates one possible hardware embodiment for performing the present invention. A server 10 resident at a customer site includes an INTEL(tm) Hobbes board 12 inserted into an empty bus slot of the server 10. Attached to the Hobbes board 12 is a modem 14 for both placing and receiving calls in response to "alerts" generated by the server and/or the Hobbes board 12. The Hobbes board 12, which has battery backup, is capable of independent operation from the server 10, even in the event where the server 10 is non-functional or a power failure has occurred. Moreover, the Hobbes board 12 can be used to provide diagnostic information from the server 10, to emulate a console for entry of commands to the server 10, to "down" a server 10, or to "reboot" a server 10.

When an alert occurs, the Hobbes board 12 dials out through the modem 14 to a private branch exchange (PBX)

16 at a central support site, and transmits an alert message to an AT&T GBCS Conversant(tm) system 18 coupled to the PBX 16. The alert message is a digital data stream formatted in any of a number of ways, as is well known in the art. However, it is envisioned that the alert message will include an encoded value indicating the type of alert that has occurred at the remote server 10.

In alternative embodiments, the alerts may trigger actions by other devices rather than the Hobbes board. For example, the alerts may trigger software performed by the server 10 that transmits the alert message to the AT&T GBCS Conversant(tm) system 18 as text messages communicated via e-mail, as text messages communicated via modem, as console messages communicated via inter-network routing, as Touch-Tone signals communicated via modem, etc. Those skilled in the art will recognize that the alert messages may be communicated using different types of alert messages and different communication methods without departing from the scope of the present invention.

The AT&T GBCS Conversant system 18 is a well known computer-implemented system that provides interactive voice response (IVR), i.e., voice recognition and voice response. The AT&T GBCS Conversant system 18 is generally comprised of a processor, electronic storage devices, and input/output devices such as voice input devices, voice response units, modems, and other devices. The AT&T GBCS Conversant system 18 is adapted to the present invention by creation, modification and enhancement of software performed by the system 18, including the creation of a command set and a menu interface that systems administrators can use to control the present invention. It is anticipated that, in a preferred embodiment, the software is tangibly embodied in the computer readable medium and includes instructions, which when executed by the processor, causes the AT&T GBCS Conversant system 18 to perform the steps necessary to implement the steps and elements described below.

The alert message is processed at the AT&T GBCS Conversant system 18 by a Conversant Call Interface 20. The Conversant Call Interface 20 comprises scripts or other software executed by the AT&T GBCS Conversant system 18 that performs a call escalation procedure in response to the alert message. By using a central support site, the present invention provides high availability to systems administrators, without redundant systems in place at the server 10.

The AT&T GBCS Conversant system 18 recognizes the server 10 by automatic number identification (ANI) of the calling number received at the PBX 16 or by an identifier transmitted within the alert message (preferably as a separate field). The unique server 10 identification helps guarantee identification and improves application security. The Conversant Call Interface 20 verifies the server 10 identification against a central database 22 maintained by the AT&T GBCS Conversant system 18.

Once the server 10 is identified, the Conversant Call Interface 20 can initiate different actions: (1) call back the server 10 to get status and/or error information, and (2) initiate a call escalation procedure to get the attention of a systems administrator. The server 10 identification and alert message are used to retrieve a particular customer-configurable, scripted, call escalation procedure from the central database 22 and the call escalation procedure is performed by the Conversant Call Interface 20.

The call escalation procedure is completely programmable and may include attempting to reach different people to respond to the alert message, e.g., to reflect a failure by a primary contact person to respond, to reflect work schedules, etc. The call escalation procedure may also include attempting to reach each person by different communications methods, e.g., e-mail, pager, facsimile, voice telephone calls, work station or console messages. The scripting of the call escalation procedure is flexible enough to handle any permutation of these methods.

Moreover, the call escalation procedure describes the format and content of the messages used to contact the person according to the method of delivery and the type of alert message received. For example, an e-mail, facsimile or console message could be a text message stored in digital format. A pager message could also be text that is stored in digital format or simply the phone number for the AT&T GBCS Conversant system 18. A phone call message could include a script used by the voice response unit of the AT&T Conversant system 18 to "voice" the predefined message. The scripting of the call escalation procedure is flexible enough to handle any permutation of these messages.

In an example of the operation of the present invention, the Conversant Call Interface 20 may dial out through the PBX 16 in a first attempt to contact a primary systems administrator for a particular server 10 at a regular pager number. The message may comprise alphanumeric text for the targeted pager. If no response is received within some predetermined period of time, the next step in the escalation procedure may be to call a different number, i.e., a home phone number or cellular phone number associated with the primary systems administrator, wherein the message may comprise a script that is "voiced" by the AT&T Conversant system 18 when the phone is answered.

The escalation procedure can be scripted to include any user-configurable sequence of events. As a result, the escalation procedure can specify any number of people to be notified of an event, the escalation order, the delay between escalations, and the method of notification (phone, pager, fax, e-mail, etc.). Any number of such steps may occur in the sequence, e.g., transmitting a specified type of message to a backup systems administrator at a particular network address or at an office phone number or at a home phone number or via their pager phone number or by e-mail address, etc.

In the preferred embodiment of the present invention, the receipt and handling of alert messages, and the subsequent activities related to the call escalation procedures, are substantially based on the Silent Sentry(tm) product sold by AT&T. This product is also sold by its original manufacturer, Gold Systems of Boulder, Colo., as the Informist(tm) product. A description of the product can be found in the publication entitled "Understanding Silent Sentry", Issue 1.0, June 1994, which publication is incorporated by reference herein.

However, the Silent Sentry product merely provides a call escalation procedure, but it does not provide the capability for the systems administrator to substantively respond to the alert messages. In contrast, the present invention provides the capability for systems administrator to issuing commands to the remote server 10, and thereby substantively respond to the alert messages.

In the present invention, once the systems administrator has been notified of the alert message by one (or more) of the above communications methods, he or she must dial back in to the PBX 16 and AT&T GBCS Conversant system 18. Once the systems administrator calls into the PBX 16, they are coupled to the Conversant Call Interface 20 performed by the AT&T GBCS Conversant system 18. In the preferred embodiment, it is anticipated that the systems administrator will be able to use voice-activated commands or Touch-Tone keypad activated commands to communicate with the Conversant Call Interface 20. It is also anticipated that the Conversant Call Interface 20 will communicate with the systems administrator using voice response units of the AT&T GBCS Conversant system 18.

At this point, the systems administrator must enter an alert response code (and potentially an administrative password) through interaction with the Conversant Call Interface 20 to acknowledge the alert message and to prevent further call escalation by the AT&T GBCS Conversant system 18. Without such an acknowledgement, the call escalation procedure continues.

During the acknowledgment of an alert message, the systems administrator is able to execute various commands via the Conversant Call Interface 20 performed by the AT&T GBCS Conversant system 18 based on his or her security level and the capabilities of the remote access device (i.e., Hobbes board 12) coupled to the server 10.

To perform commands at the server 10, the Conversant Call Interface 20 interacts with a Server Communications Service 24. The Server Communications Service 24 comprises scripts or other software executed by the AT&T GBCS Conversant system 18. The Server Communications Service 24 dials out through a modem 26 attached to the AT&T GBCS Conversant system 18 to communicate to the Hobbes board 12 via its modem 14. In alternative embodiments, the Server Communications Service 24 may communicate with the system console of the remote server 10 via inter-network routing, or it may communicate with the remote server 10 directly via modem, or it may communicate with the remote server 10 in some other way. Those skilled in the art will recognize that the method and format of communication with the remote server 10 may occur in different ways without departing from the scope of the present invention.

It is also envisioned that the Server Communications Service 24 may be used by the AT&T GBCS Conversant system 18 to obtain error, diagnostic, and status information about the server 10. Such actions may be performed prior to, in parallel with, or after attempting to contact the systems administrator to respond to the alert message. In addition, such actions may be performed in response to commands entered by the systems administrator.

In the preferred embodiment of the present invention, it is envisioned that the systems administrator will be able to issue the following commands to the server 10 via the AT&T GBCS Conversant system 18:

get console log
get post codes
get temperature
get voltage
set temperature lower alert
set temperature upper alert
set voltage lower alert
set voltage upper alert
Additional commands that may also be included:
down [Server | device | program]
up [Server | device | program]
reboot Server Of course, those skilled in the art will recognize that any number of additional commands and responses for emergency remote server administration are possible using the present invention. The above command and response set are merely exemplary of the capabilities of the present invention.

Typically, the above commands can be selected using Touch-Tone keypad signals from a menu voiced by a voice response unit attached to the AT&T GBCS Conversant system 18. However, the present invention also permits the above commands to be entered vocally by the systems administrator via telephone, wherein the voice commands are then recognized and translated by voice recognition functions performed by the AT&T GBCS Conversant system 18.

Figure 2:
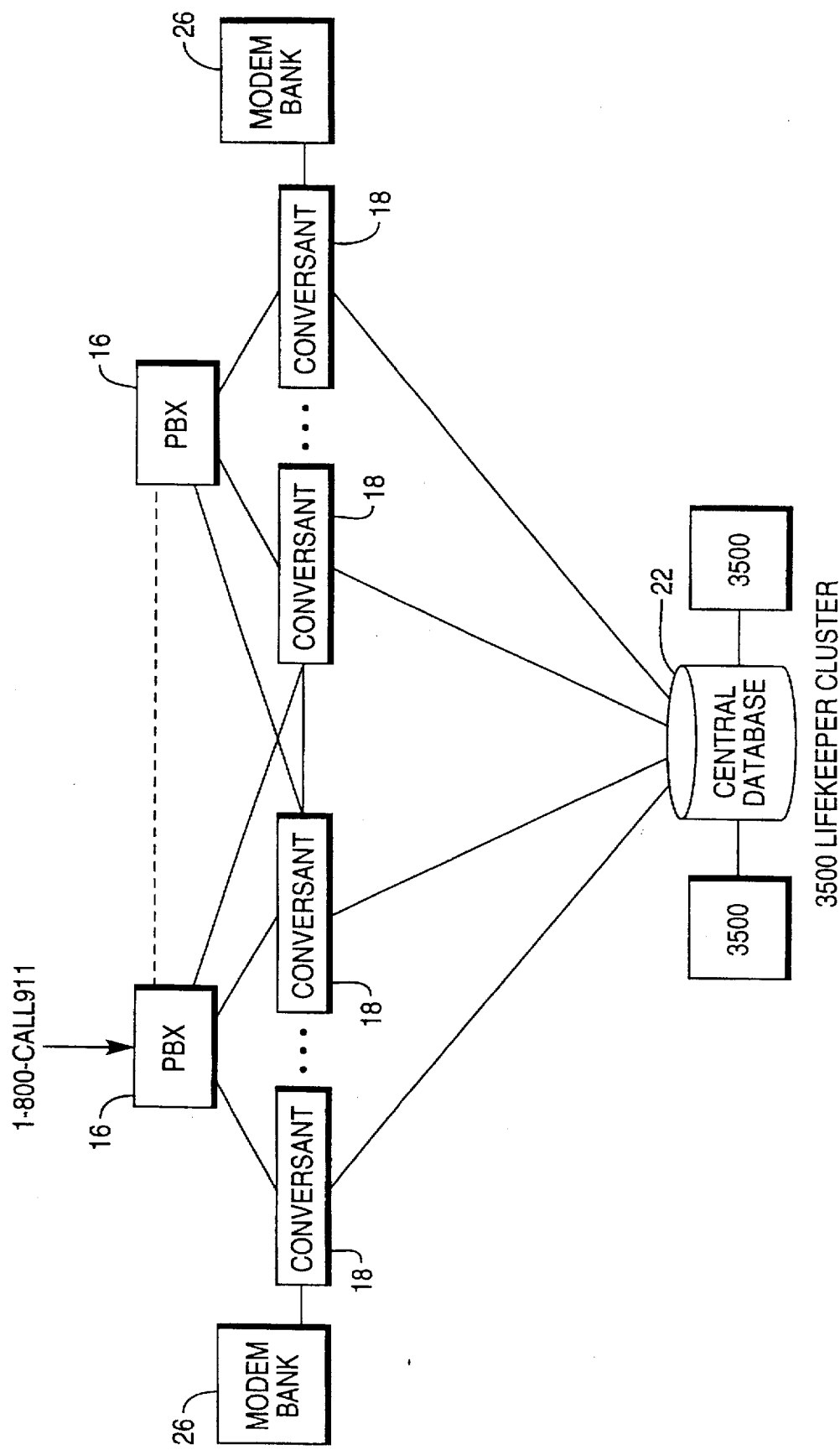
FIG. 2 illustrates a high level view of an alternative hardware embodiment for FIG. 1 that illustrates a fault tolerant configuration of the central support site.

FIG. 2 illustrates a high level view of an alternative hardware embodiment for FIG. 1 that illustrates a fault tolerant configuration of the central support site. High availability of the central support site can be guaranteed by a combination of standard PBX 16 fail over features, multiple AT&T GBCS Conversant systems 18 monitoring multiple PBXs 16, and each other, and by a central database 22 implemented on a 3500 LifeKeeper Cluster from AT&T Global Information Solutions, which may be geographically distributed and/or replicated.

Figure 3:
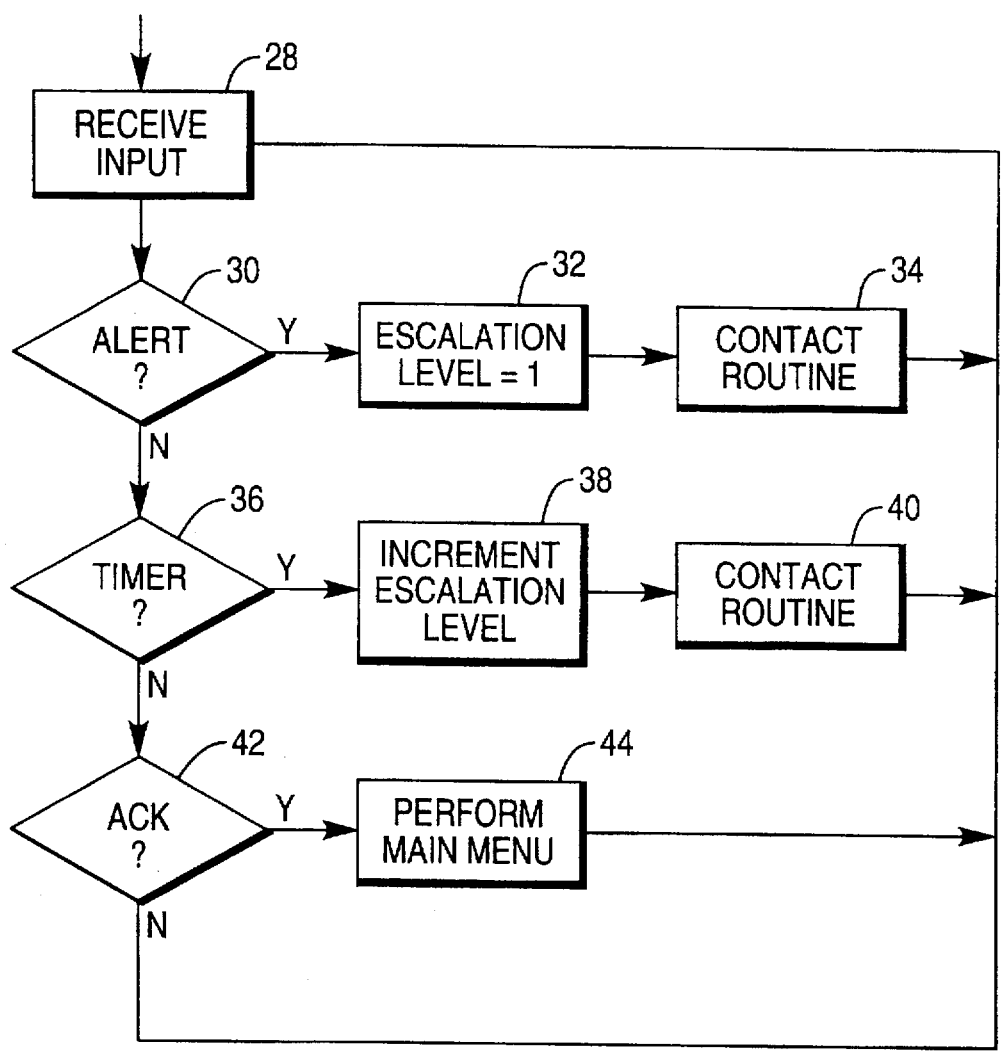
FIG. 3 is a flowchart illustrating the logic performed by the AT&T Conversant system during the call escalation procedure.

FIG. 3 is a flowchart illustrating the logic performed by the AT&T GBCS Conversant system 18 during the call escalation procedure. Box 28 represents the receipt of input, either an alert message from the remote server 10, a timer that has been set within the AT&T GBCS Conversant system 18, or by the input of an acknowledgement into the AT&T GBCS Conversant system 18 by a responding systems administrator. Block 30 is a decision block that determines whether the input is an alert from the remote server 10. If so, block 32 represents the AT&T GBCS Conversant system 18 setting of an initial escalation level and block 34 represents the AT&T GBCS Conversant system 18 performing a contact routine, further described in FIG. 4. After the contact routine is performed at block 34, control transfers to block 28. Block 36 is a decision block that determines whether the input is a timer expiration in the AT&T GBCS Conversant system 18. If so, block 38 represents the AT&T GBCS Conversant system 18 incrementing of the escalation level and block 40 represents the AT&T GBCS Conversant system 18 performing the contact routine, as described in FIG. 4. After the contact routine is performed at block 40, control transfers to block 28. Block 42 is a decision block that determines whether the input is an acknowledgement from an administrator. If so, block 44 represents the AT&T GBCS Conversant system 18 performing the Main Menu routine described further in FIGS. 5A–5D. Note that since the timer used in the call escalation is renewed, this terminates the call escalation procedure. After the Main Menu routine is performed at block 44, control transfers to block 28.

Figure 4:
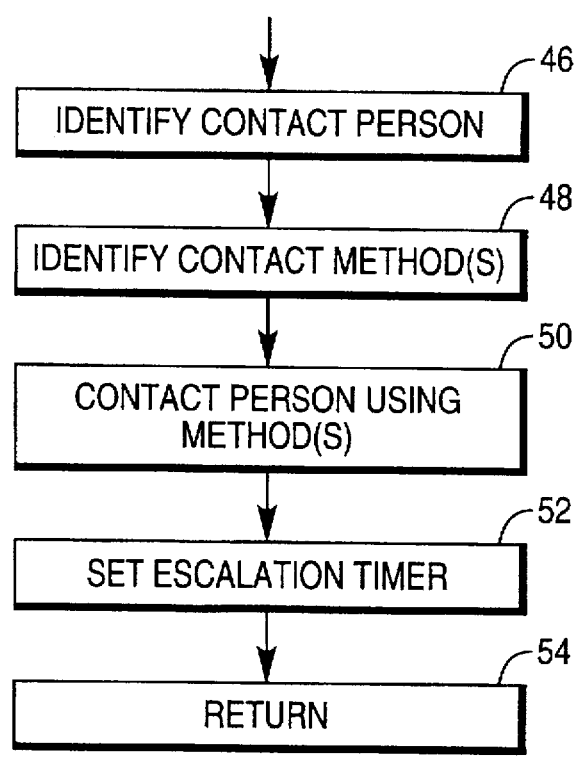
FIG. 4 is a flowchart illustrating the logic performed by the AT&T Conversant system during the contact routine referenced in FIG. 3.
Figure 5A:
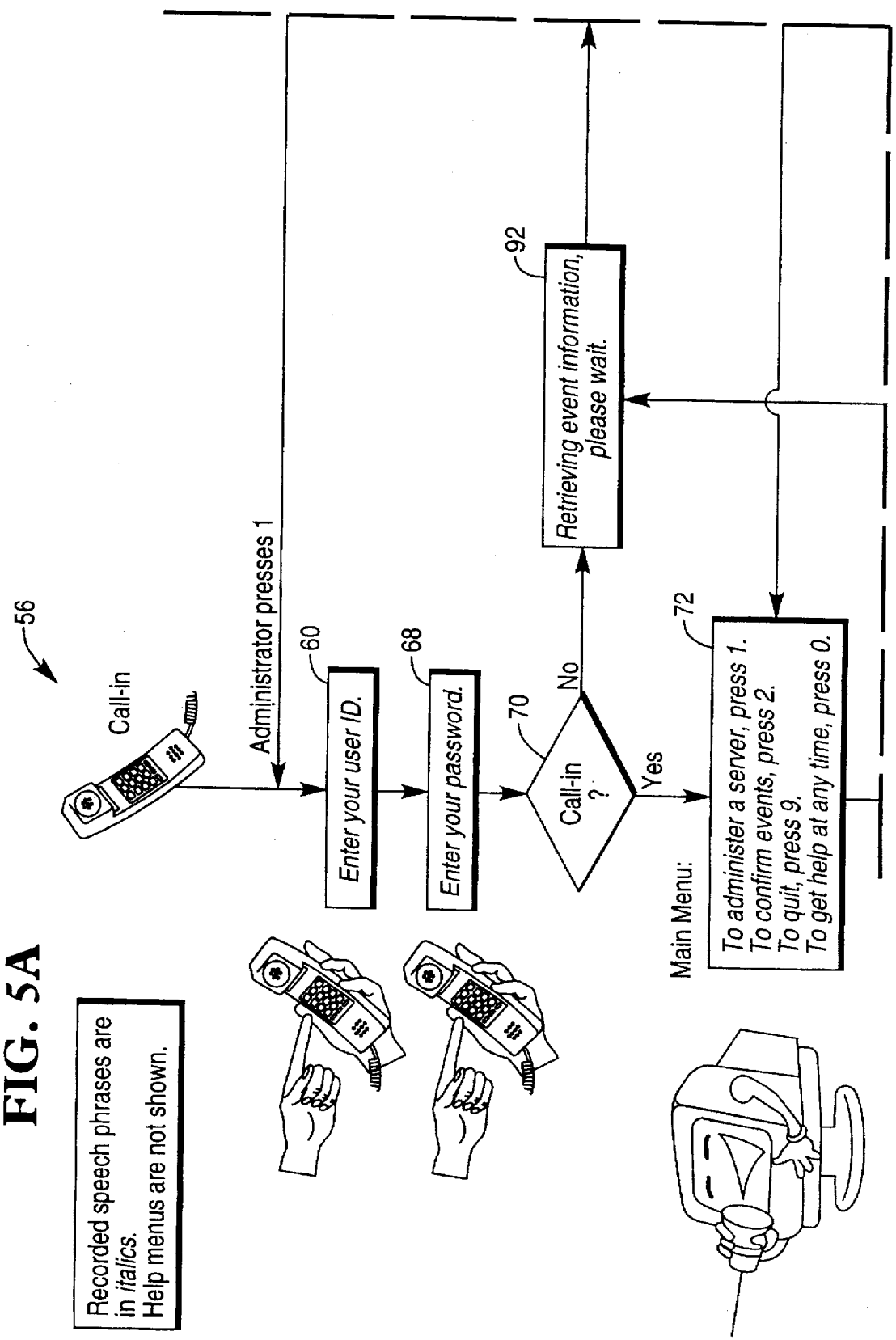
Figure 5B:
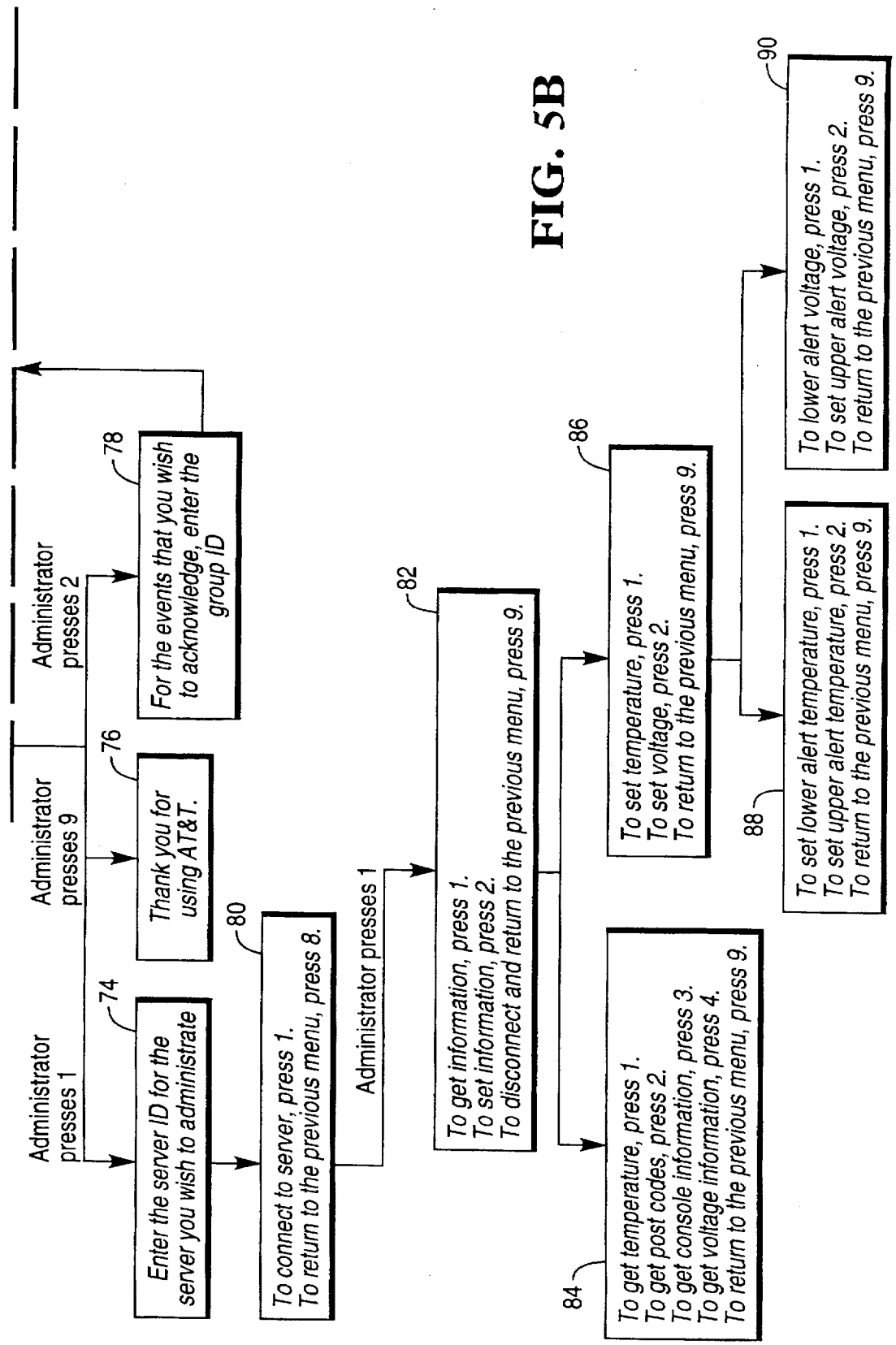
Figure 5D:
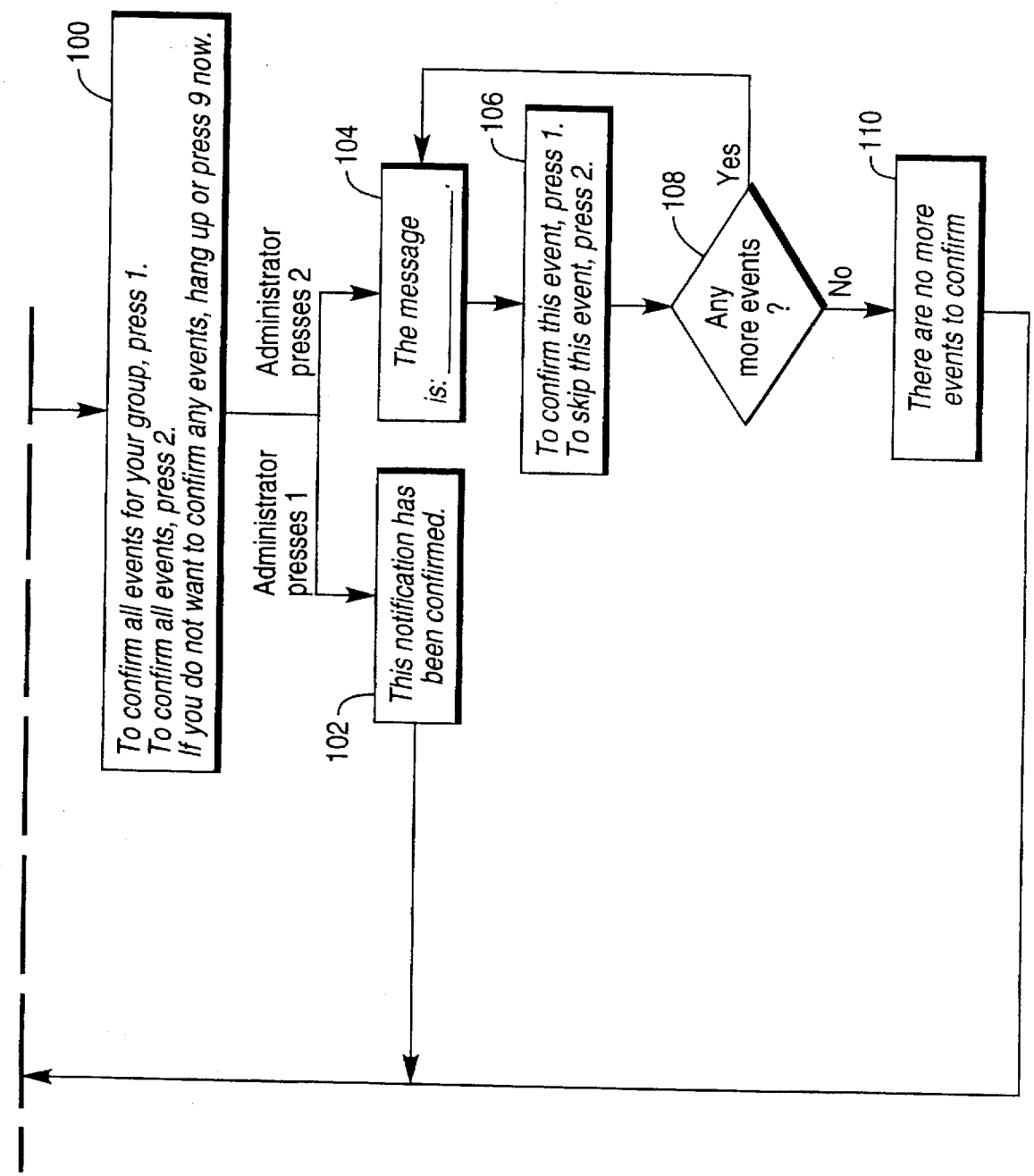

FIG. 4 is a flowchart illustrating the logic performed by the AT&T GBCS Conversant system 18 during the contact routine referenced in FIG. 3. Block 46 represents the AT&T GBCS Conversant system 18 referencing the call escalation procedure retrieved from the central database 22 to identify the contact person for the current escalation level. Block 48 represents the AT&T GBCS Conversant system 18 referencing the call escalation procedure retrieved from central database 22 to identify the contact method or methods for the identified contact person for the current escalation level. Block 50 represents the AT&T GBCS Conversant system 18 attempting to contact the contact person using contact methods specified earlier in this specification. Block 52 represents the AT&T GBCS Conversant system 18 setting an escalation timer to wait for an acknowledgement from the contact person before proceeding to the next level of the call escalation procedure. Block 54 represents a return from the contact routine.

FIGS. 5A–5D are flowcharts illustrating the logic performed by the AT&T GBCS Conversant system 18 in responding to a systems administrator. The systems administrator may independently call into the AT&T GBCS Conversant system 18, as indicated by reference number 56. Alternatively, the systems administrator may respond to a telephone call placed by the AT&T GBCS Conversant system 18, as indicated by block 58, without the need for calling back into the system 18. Block 58 represents the AT&T GBCS Conversant system 18 having placed a call to a phone number associated with the primary systems administrator, and voicing a message when the phone is answered. The message invites the systems administrator to respond in several ways, by pressing 1 to accept the call, by pressing 2 to place the call on hold temporarily, and by pressing 3 to have the system 18 disconnect and not call again. Blocks 60, 62, 64, and 66 represent the AT&T GBCS Conversant system 18 performing these various functions. If the systems administrator does accept the call, or if the systems administrator has called into the system 18 in response to call escalation procedure, then block 60 represents the systems administrator entering a user ID into the AT&T GBCS Conversant system 18. Block 68 represents the systems administrator entering a password into the AT&T GBCS Conversant system 18. Once the password is entered, block 70 represents a decision block wherein the AT&T GBCS Conversant system 18 determines whether the call with the systems administrator is a call-in (56) or call-out (58). If a call-in has occurred, then control transfer to block 72; otherwise control transfers to block 92.

Block 72 represents the AT&T GBCS Conversant system 18 providing a voice response to the systems administrator identifying the main menu of the system. Thereafter, the systems administrator can use a Touch-Tone keypad to respond to the menu, e.g., by pressing 1 to administer the server 10, by pressing 9 to quit, by pressing 2 to confirm events, and by pressing 0 for help (not shown).

After pressing 1 to administer the server 10, block 74 represents the AT&T GBCS Conversant system 18 providing a voice response to the systems administrator prompting for the server identification code and the systems administrator entering a server identification code. After correctly entering the server identification code, block 80 represents the AT&T GBCS Conversant system 18 providing a voice response to the systems administrator identifying the menu for administering the server 10. Thereafter, the systems administrator can use a Touch-Tone keypad to respond to the menu, e.g., by pressing 1 to connect to the server 10, and by pressing 8 to return to the previous menu.

After pressing 1 to administer the server 10, block 82 represents the AT&T GBCS Conversant system 18 providing a voice response to the systems administrator identifying the menu for obtaining information on the server 10. Thereafter, the systems administrator can use a Touch-Tone keypad to respond to the menu, e.g., by pressing 1 to get information on the status of the server 10, by pressing 2 to set information in the server 10, and by pressing 9 to disconnect from the server 10 and return to the previous menu.

After pressing 1 to get information from the server 10, block 84 represents the AT&T GBCS Conversant system 18 providing a voice response to the systems administrator identifying the menu for obtaining specific information on the server 10. Thereafter, the systems administrator can use a Touch-Tone keypad to respond to the menu, e.g., by pressing 1 to get the temperature of the status of the server 10, by pressing 2 to get POST codes from the server 10, by pressing 3 to get console information from the server 10, by pressing 4 to get voltage information from the server 10, and by pressing 9 to return to the previous menu.

After pressing 2 to set information in the server 10, block 86 represents the AT&T GBCS Conversant system 18 providing a voice response to the systems administrator identifying the menu for setting information in the server 10. Thereafter, the systems administrator can use a Touch-Tone keypad to respond to the menu, e.g., by pressing 1 to set the temperature limits on the server 10, by pressing 2 to set voltage limits on the server 10, and by pressing 9 to return to the previous menu.

After pressing 1 to set the temperature limits on the server 10, block 88 represents the AT&T GBCS Conversant system 18 providing a voice response to the systems administrator identifying the menu for setting temperature limits in the server 10. Thereafter, the systems administrator can use a Touch-Tone keypad to respond to the menu, e.g., by pressing 1 to set the lower alert temperature in the server 10, by pressing 2 to set the upper alter temperature in the server 10, and by pressing 9 to return to the previous menu.

After pressing 2 to set the voltage limits on the server 10, block 90 represents the AT&T GBCS Conversant system 18 providing a voice response to the systems administrator identifying the menu for setting voltage limits in the server 10. Thereafter, the systems administrator can use a Touch-Tone keypad to respond to the menu, e.g., by pressing 1 to set the lower alert voltage in the server 10, by pressing 2 to set the upper alter voltage in the server 10, and by pressing 9 to return to the previous menu.

Returning to block 72, after pressing 2 to confirm alter events for the server 10, block 78 represents the AT&T GBCS Conversant system 18 providing a voice response to the systems administrator prompting for the group identification code related to the alert events, and the systems administrator entering a group identification code. After correctly entering the group identification code, block 92 represents the AT&T GBCS Conversant system 18 providing a voice response to the systems administrator identifying the retrieval of the event information. Thereafter, control transfers to block 94.

Block 94 is a decision block represents the AT&T GBCS Conversant system 18 determining whether there are any events to report. If not, control transfers to block 96, which represents the AT&T GBCS Conversant system 18 providing a voice response to the systems administrator stating that there are no events to report. Thereafter, control transfers to block 72.

Otherwise, if there are events to report, control transfers from block 94 to block 98, which represents the AT&T GBCS Conversant system 18 providing a voice response to the systems administrator identifying the number of events to report. Thereafter, control transfers to block 100.

Block 100 represents the AT&T GBCS Conversant system 18 providing a voice response to the systems administrator identifying the events confirmation menu of the system. Thereafter, the systems administrator can use a Touch-Tone keypad to respond to the menu, e.g., by pressing 1 to confirm all events for the associated group, by pressing 2 to confirm specific events, and by pressing 9 (or hanging up) to not confirm any events.

After pressing 1 to confirm all events, block 102 represents the AT&T GBCS Conversant system 18 providing a voice response to the systems administrator stating that all events for the associated group have been confirmed. Thereafter, control transfers to block 72.

After pressing 2 to confirm specific events, block 104 represents the AT&T GBCS Conversant system 18 providing a voice response to the systems administrator for the initial event and block 106 represents the AT&T GBCS Conversant system 18 providing a voice response to the systems administrator identifying the specific events confirmation menu of the system. Thereafter, the systems administrator can use a Touch-Tone keypad to respond to the menu, e.g., by pressing 1 to confirm the specific event or by pressing 2 to skip the specific event confirmation. Block 108 is a decision block representing the AT&T GBCS Conversant system 18 determining whether there are more events. If so, control transfers to block 104. Otherwise, control transfers to block 110, which represents the AT&T GBCS Conversant system 18 providing a voice response to the systems administrator stating that there are no more events to confirm, and then control transfers to block 72.

The above sequence of steps provides a minimal set of responses and commands for the systems administrator. In an alternative embodiment of the above sequence, the AT&T GBCS Conversant system 18 would also prompt for and accept commands from the systems administrator to retrieve additional information on the state of the server 10, to retrieve information on the state of various software processes or devices, to shutdown or startup the server 10 itself or various software processes executed by the server 10 or devices attached to the server, to reboot the server 10, to power down and power up the server 10, etc.

In addition, although the above example envisions that the systems administrator uses Touch-Tone keypad signals to respond to menus and selections voiced by a voice response unit attached to the AT&T GBCS Conversant system 18, an alternative embodiment of the present invention also permits the above sequence to accept commands entered vocally by the systems administrator via telephone, wherein the voice commands are then recognized and translated by voice recognition functions performed by the AT&T GBCS Conversant system 18. For example, blocks 84, 86, 88, and 90 could be eliminated and replaced by a single block where the AT&T GBCS Conversant system 18 prompts for a voice command, recognizes and translates the voice command, and then performs the desired functions or transmits the commands directly to the remote server 10. In addition, the AT&T GBCS Conversant system 18 providing a voice response to the systems administrator translating any responses to the transmitted commands received from the server 10.

In conclusion, the foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed:

1. A method for remotely administrating a computer server, comprising the steps of:
   (a) receiving an alert message from a remote server at a central support site;
   (b) matching the alert message to a contact person for the server stored in a database at the central support site;
   (c) transmitting a message from the central support site to the contact person via electronic communications;
   (d) waiting for a call from the contact person at the central support site for a predetermined period of time;
   (e) matching the alert message to a backup person for the server stored in the database at the central support site when the call from the contact person is not received within the predetermined period of time;
   (f) identifying the backup person as the contact person when the call is not received within the predetermined period of time;
   (g) fire-transmitting the message from the central support site to the backup person via electronic communications when the call is not received within the predetermined period of time;
   (h) receiving the call from the contact person at the central support site;
   (i) matching the call from the contact person to the alert message at the central support site;
   (j) receiving one or more commands from the contact person at the central support site; and
   (k) transmitting the received commands from the central support site to the remote server.

2. The method of claim 1, wherein the received commands are voice commands, the method further comprises the step of translating the voice commands into server commands, and the transmitting step (k) comprises the step of transmitting the server commands from the central support site to the remote server.

3. The method of claim 1, wherein the received commands are Touch-Tone keypad commands, the method further comprises the step of translating the Touch-Tone keypad commands into server commands, and the transmitting step (k) comprises the step of transmitting the server commands from the central support site to the remote server.

4. The method of claim 1, wherein the transmitting step (c) comprises the step of transmitting the message from the central support site to the contact person via an electronic communications method selected from a group comprising console messages, e-mail, pager, voice phone call, and facsimile.

5. A method for remotely administrating a computer server, comprising the steps of:
   (a) receiving an alert message from a remote server at a central support site;
   (b) matching the alert message to a contact person for the server stored in a database at the central support site;
   (c) transmitting a message from the central support site to the contact person via electronic communications;
   (d) receiving a call from the contact person at the central support site;
   (e) matching the call from the contact person to the alert message at the central support site;
   (f) receiving one or more commands from the contact person at the central support site;
   (g) transmitting the received commands from the central support site to the remote server;
   (h) transmitting status queries from the central support site to the remote server;
   (i) receiving one or more responses to the status queries from the remote server at the central support site; and
   transmitting the responses from the central support site to the contact person via electronic communications.

6. An apparatus for remotely administrating a computer server, comprising:
   (a) a processor having a memory and an electronic storage device coupled thereto, wherein the processor is coupled to one or more telephone lines;
   (b) means, performed by the processor, for receiving an alert message from a remote server;

(c) means, performed by the processor, for matching the alert message to a contact person for the server stored in the electronic storage device;

(d) means, performed by the processor, for transmitting a message to the contact person via electronic communications;

(e) means, performed by the processor, for waiting for a call from the contact person for a predetermined period of time;

(f) means, performed by the processor, for matching the alert message to a backup person for the server stored in the electronic storage device when the call from the contact person is not received within the predetermined period of time;

(g) means, performed by the processor, for identifying the backup person as the contact person when the call is not received within the predetermined period of time;

(h) means, performed by the processor, for re-transmitting the message to the backup person via electronic communications when the call from the contact person is not received within the predetermined period of time;

(i) means, performed by the processor, for receiving the call from the contact person;

(j) means, performed by the processor, for matching the call from the contact person to the alert message;

(k) means, performed by the processor, for receiving one or more commands from the contact person, and (l) means, performed by the processor, for transmitting the received commands from the central support site to the remote server.

7. The apparatus of claim 6, wherein the received commands are voice commands, the apparatus further comprises means for translating the voice commands into server commands, and the means for transmitting (l) comprises means for transmitting the server commands from the central support site to the remote server.

8. The apparatus of claim 6, wherein the received commands are Touch-Tone keypad commands, the apparatus further comprises means for translating the Touch-Tone keypad commands into server commands, and the means for transmitting (l) comprises means for transmitting the server commands from the central support site to the remote server.

9. The apparatus of claim 6, wherein the means for transmitting (d) comprises means for transmitting the message to the contact person via an electronic communications method selected from a group comprising console messages, e-mail, pager, voice phone call, and facsimile.

10. An apparatus for remotely administrating a computer server, comprising:

(a) a processor having a memory and an electronic storage device coupled thereto, wherein the processor is coupled to one or more telephone lines;

(b) means, performed by the processor, for receiving an alert message from a remote server;

(c) means, performed by the processor, for matching the alert message to a contact person for the server stored in the electronic storage device;

(d) means, performed by the processor, for transmitting a message to the contact person via electronic communications;

(e) means, performed by the processor, for receiving a call from the contact person;

(f) means, performed by the processor, for matching the call from the contact person to the alert message;

(g) means, performed by the processor, for receiving one or more commands from the contact person;

(h) means, performed by the processor, for transmitting the received commands from the central support site to the remote server;

(i) means, performed by the processor, for transmitting status queries to the remote server;

(j) means, performed by the processor, for receiving one or more responses to the status queries from the remote server; and (k) means, performed by the processor, for transmitting the responses to the contact person via electronic communications.

11. A program storage device, readable by a processor, tangibly embodying one or more programs of instructions executable by the processor to perform method steps for remotely administrating a computer server, the method comprising the steps of:

(a) receiving an alert message from a remote server at the processor;

(b) matching the alert message to a contact person for the server stored in a database at the processor;

(c) transmitting a message from the processor to the contact person via electronic communications;

(d) waiting for a call from the contact person at the processor for a predetermined period of time;

(e) matching the alert message to a backup person for the server stored in the database at the processor when the call from the contact person is not received within the predetermined period of time;

(f) identifying the backup person as the contact person when the call is not received within the predetermined period of time;

(g) re-transmitting the message from the processor to the backup person via electronic communications when the call from the contact person is not received within the predetermined period of time;

(h) receiving the call from the contact person at the processor;

(i) matching the call from the contact person to the alert message at the processor;

(j) receiving one or more commands from the contact person at the processor; and (k) transmitting the received commands from the central support site to the remote server.

12. The program storage device of claim 11, wherein the received commands are voice commands, the method further comprises the step of translating the voice commands into server commands, and the transmitting step (k) comprises the step of transmitting the server commands from the central support site to the remote server.

13. The program storage device of claim 11, wherein the received commands are Touch-Tone keypad commands, the method further comprises the step of translating the Touch-Tone keypad commands into server commands, and the transmitting step (k) comprises the step of transmitting the server commands from the central support site to the remote server.

14. The program storage device of claim 11, wherein the transmitting step (c) comprises the step of transmitting the message from the processor to the contact person via an electronic communications method selected from a group comprising console messages, e-mail, pager, voice phone call, and facsimile.

15. A program storage device, readable by a processor, tangibly embodying one or more programs of instructions executable by the processor to perform method steps for remotely administrating a computer server, the method comprising the steps of:

(a) receiving an alert message from a remote server at the processor;

(b) matching the alert message to a contact person for the server stored in a database at the processor;

(c) transmitting a message from the processor to the contact person via electronic communications;

(d) receiving a call from the contact person at the processor, (e) matching the call from the contact person to the alert message at the processor; and (f) receiving one or more commands from the contact person at the processor;

(g) transmitting the received commands from the central support site to the remote server;

(h) transmitting status queries from the processor to the remote server;

(i) receiving one or more responses to the status queries from the remote server at the processor; and (j) transmitting the responses from the processor to the contact person via electronic communications.

* * * * *

UNITED STATES PATENT AND TRADEMARK OFFICE
CERTIFICATE OF CORRECTION

PATENT NO. : 5,745,692
DATED : April 28, 1998
INVENTOR(S) : David Peter Lohmann, II, et al.

It is certified that error appears in the above-indentified patent and that said Letters Patent is hereby corrected as shown below:

Column 10, line 6, after "(g)" delete "fire" and insert --re--.

Column 10, line 58, before "transmitting" insert --(j)--.

Signed and Sealed this

Twenty-first Day of July, 1998

Attest:

BRUCE LEHMAN

*Attesting Officer*  *Commissioner of Patents and Trademarks*